United States Patent [19]
Hanawa et al.

[11] Patent Number: 5,881,078
[45] Date of Patent: Mar. 9, 1999

[54] LOGIC CIRCUIT HAVING ERROR DETECTION FUNCTION AND PROCESSOR INCLUDING THE LOGIC CIRCUIT

[75] Inventors: Makoto Hanawa, Niiza; Yoshio Miki, Kodaira; Tatsuya Kawashimo, Hadano, all of Japan

[73] Assignee: Hitachi, Ltd., Tokyo, Japan

[21] Appl. No.: 989,414

[22] Filed: Dec. 12, 1997

[30] Foreign Application Priority Data

Dec. 13, 1996 [JP] Japan .................................. 8-352921

[51] Int. Cl.⁶ ...................................................... G06F 11/06
[52] U.S. Cl. ............................................................. 371/70
[58] Field of Search ........................... 371/70, 67.1, 22.6, 371/22.1, 22.5, 38.1, 25.1

[56] References Cited

FOREIGN PATENT DOCUMENTS 2-168724  6/1990  Japan .
3-237698  10/1991  Japan .
6-267295  9/1994  Japan .

OTHER PUBLICATIONS

S. Horiguchi et al, "An Automatically Designed 32b CMOS VLSI Processor", 1982 IEEE International Solid–States Circuits Conference—Digest of Technical Papers, Feb. 1982, pp. 54–55.

1996 IEEE International Solid–States Circuits Conference, Tutorial #4, "Dynamic Logic: Clocked and Asynchronous", Feb. 1996, pp. 1 and 21.

*Primary Examiner*—Vincent P. Canney
*Attorney, Agent, or Firm*—Fay, Sharpe, Beall, Fagan, Minnich & McKee

[57] ABSTRACT

Soft errors generated at an active time are reduced by adding a small-scale circuit to a high performance LSI, such as a processor without reducing the performance of the circuit. The processor has individual logic circuits each having a plurality of stages of logic gates for outputting true signals and complement signals for the individual logic gates. A latch circuit latches the true and complement signals of the logic circuits separately and a compare circuit detects for an error by comparing the true and complement output signals of the logic circuits to determine if they are at the same logical signal level or not, just upstream of the latch in which the individual true and complement output signals of the final logic circuit stages are individually latched. When the compare circuit detects an error because the true and complement output signals are at the same logical signal level, a recovery process is executed.

22 Claims, 4 Drawing Sheets

| XT | XB | YT | YB | ZT | ZB | REMARKS |
|----|----|----|----|----|----|---------|
| H  | H  | H  | L  | H  | H  | ERROR PROPAGATION |
|    |    | L  | H  | L  | H  | NORMAL (INPUT X IGNORED) |
| L  | L  | H  | L  | L  | L  | ERROR PROPAGATION |
|    |    | L  | H  | L  | H  | NORMAL (INPUT X IGNORED) |

| XT | XB | YT | YB | ZT | ZB | REMARKS |
|----|----|----|----|----|----|---------|
| H  | H  | H  | L  | H  | L  | NORMAL (INPUT X IGNORED) |
|    | L  | L  | H  | H  | H  | ERROR PROPAGATION |
| L  | L  | H  | L  | H  | L  | NORMAL (INPUT X IGNORED) |
|    | L  | L  | H  | L  | L  | ERROR PROPAGATION |

FIG. 6

LOGIC CIRCUIT HAVING ERROR DETECTION FUNCTION AND PROCESSOR INCLUDING THE LOGIC CIRCUIT

BACKGROUND OF THE INVENTION

The present invention relates to a logic circuit including a logic LSI such as a processor that has a resistance of soft errors at an active time and, more particularly, to a high-performance microprocessor having error detection logic.

A logic LSI having high-speed action can be realized by a dynamic logic circuit. The dynamic logic circuit determines the potential of an output signal by holding or discharging a charge, which is stored in a dynamic node by a precharge, in accordance with a logic function. As a result, no short current flows at the active time so that the dynamic logic circuit can act at a high speed.

However, the charge, as stored in the dynamic node, may be erroneously discharged by noise caused, for example, by the incidence of α rays. At such time, the result of the logic function cannot be correctly reflected in the output of the dynamic logic circuit thereby to cause an error. This type of error will occur not steadily but only with the occurrence of noise such as the incidence of α rays, so that it is called "soft error".

A technique for making the high-speed action possible while resisting the aforementioned soft error at a single gate level is disclosed in Japanese Patent Laid-Open No. 168724/1990 (hereinafter the "First Prior Art"). This technique is realized by noise suppression means for holding the charge of a dynamic node after the precharge action, and means for precharging the internal node of an n-MOS network constructing the logic function. If the noise suppression means for holding the charge of the dynamic node is strengthened, the soft error can be sufficiently suppressed. On the other hand, however, the short current at the logic action time is increased to obstruct the high-speed action. By precharging the internal node of the n-MOS network constructing the logic function, therefore, the noise is prevented from occurring due to the charge share, and the noise suppression means for holding the charge of the dynamic node suppresses only the noise due to the incidence of α rays. As a result, the strength of the noise suppression means can be reduced to a minimum necessary for suppressing the occurrence of noise due to the incidence of α rays, so that the short current at the logic action time can be reduced to allow a high-speed action at some level.

An example of attaining resistance to soft error not at the single gate level but for a logic block of considerable size is disclosed on pp. 54 to 55 of "1982 IEEE International Solid-State Circuits Conference DIGEST OF TECHNICAL PAPERS" (hereinafter the "Second Prior Art"). According to the disclosed method, an error is detected in data by adding parity to the data and detecting an error in a logic circuit by duplexing a logic circuit to compare its outputs. Thus, there is provided means for discriminating between normal and abnormal actions, not by suppressing the occurrence of a noise due to the incidence of α rays, but by detecting the soft error due to noise directly.

A method of constructing a logic circuit having an effect similar to that of duplex logic circuits is disclosed on pg. 21 of "1996 IEEE International Solid-State Circuits Conference TUTORIAL#4" (hereinafter the "Third Prior Art"). The dynamic logic circuit forming the single gate is a circuit for generating both a true output and a complement output. Because of the dynamic circuit, both the output signals take a low potential at the precharge time, and one of the output signals is changed to a high potential at the logic action time. Since both the output signals intrinsically never take high potential at the same time, the error can be detected if both the output signals should simultaneously take the high potential.

SUMMARY OF THE INVENTION

The aforementioned First Prior Art assumes that the working level of the LSI is 0.5 microns, and that the supply voltage is 4.5 V. As the miniaturization of the LSI advances in the future, it is estimated that the working level becomes smaller than 0.25 microns, and that the supply voltage becomes lower than 2.0 V. As a result, the amount of charge to be stored in the dynamic node decreases along with the miniaturization of the LSI and with the drop in the supply voltage.

As in the aforementioned First Prior Art, therefore, the strength of the noise suppression means is reduced to the minimum necessary for suppressing the occurrence of the noise due to the incidence of α rays. If the miniaturization of the LSI advances, however, the noise suppression means has to be made far stronger than that at the working level of the prior art. As a result, the short current at the logic action time increases to bring about a problem that the high-speed action becomes difficult.

Therefore, a first object of the present invention is to provide effective soft error resistance that does not adversely affect the high-speed action of a logic circuit even in an LSI having a fine working level.

In the aforementioned Second Prior Art, on the other hand, the occurrence of a soft error has been detected by a dedicated circuit such as a parity circuit or a duplex logic circuit. With respect to a single gate forming the ordinary logic circuit, the occurrence of soft error need not be suppressed and therefore does not cause an obstruction to the high-speed action. However, the use of the dedicated circuit for the detection raises a problem that the circuit scale is enlarged.

Therefore, a second object of the present invention is to provide means for detecting the soft error while minimizing the increase in the circuit scale.

In the aforementioned Third Prior Art, the occurrence of an error is indicated when both the true and complement output signals to be generated by the dynamic logic circuit simultaneously take the high potential.

However, the aforementioned Third Prior Art, although describing a dynamic logic circuit forming the single gate, does not taken into consideration the investigation of a specific error detection circuit and the action taken after error detection.

Therefore, a third object of the present invention is to provide a soft error resistant logic LSI for positively detecting the error of a dynamic logic circuit.

In order to solve the aforementioned problems, according to the present invention, there is provided a logic circuit having an error detection function and comprising a plurality of stages of logic gates for outputting true signals and complement signals for each logic gate. The logic circuit has a detection circuit for detecting whether the true output signals and the complement output signals are not in a relation of inverted signal levels, that the true output signals and the complement output signal are same at the logic signal level, by comparing the true and complement output signals at the time of outputting a logic signal of the logic circuit.

The logic gates of the logic circuit are precharged logic gates for resetting both the true output signals and the complement output signals to an identical signal level at the precharge time and for inverting only one of the signals at the logic operation time (between a first precharge time and a next precharge time after the first precharge time), the detection circuit detects the relation of the signal levels by comparing the relation between both the true and complement output signals of the logic circuit (only) at the logic operation time.

There is further provided, according to the invention, a multistage logic circuit having logic circuits connected in multiple stages so that the true output signals and the complement output signals of the multistage logic circuits are converted into one of either true or complement signals and outputted, wherein a detection circuit detects whether the true output signals and the complement output signals are not in a relation of inverted signal levels, by comparing the true and complement output signals arranged at a point in the multistage logic circuit only just before the true output signals and the complement output signals are converted into one of either the true signals or the complement signals.

When a data latch is arranged at an intermediate stage of the multistage logic circuit, the data latch holds the true output signals and the complement output signals independently of each other, and the detection circuit detects the relation of the signal levels is arranged at a point in the multistage logic circuit only just before the true output signals and the complement output signals are converted into one of either the true signals or the complement signals.

There is further provided, according to the invention, a processor having a logic circuit with an error detection function, and a circuit for canceling an operation midway that has caused an error, and retrying the operation from the beginning, when the error in the logic circuit is detected while the operation is being executed.

There is further provided a processor, according to the invention, having a logic circuit with an error detection function and having an operation controlled by an instruction. The logic circuit cancels the execution of an instruction midway that has caused an error, and retrys the instruction from the beginning, when the error in the logic circuit is detected while the instruction is being executed.

BRIEF DESCRIPTION OF THE DRAWINGS

FIG. 6 is a diagram presenting a table for explaining the functions of the logic gate 200 of FIG. 5.

DETAILED DESCRIPTION OF THE PREFERRED EMBODIMENT

Figure 1:
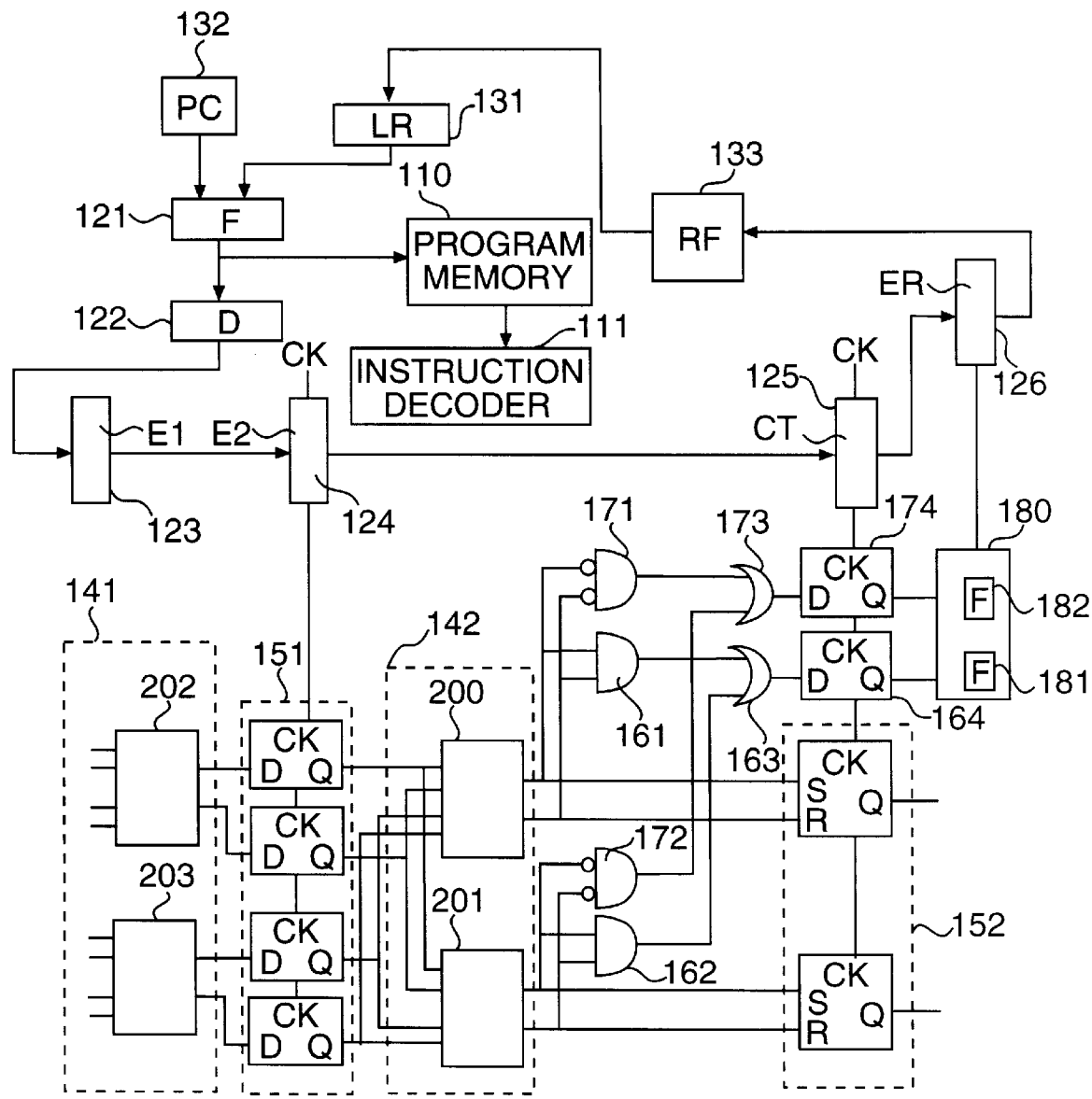
FIG. 1 is a diagram of a configuration of a processor according to a preferred embodiment of the present invention.

A logic circuit having an error detection function and a microprocessor equipped with the logic circuit for retrying operations when an error occurs will be described in more detail with reference to embodiments according to the present invention. Here, the common reference numerals appearing in FIGS. 1 to 3 designate identical or similar portions. <Construction and Operations of Microprocessor>

FIG. 1 is a configuration diagram of a microprocessor having an error detection circuit of a logic circuit that retrys operations when an error occurs. The microprocessor of the present embodiment reads an instruction, as stored in a program memory 110, for executing operations in accordance with the read (fetch) instruction.

For operating the instruction, the present embodiment adopts six pipeline stages. These pipeline stages are:
  (1) Calculation of Instruction Address (IA Stage)
  (2) Read of Instruction (IF Stage)
  (3) Decode of Instruction (ID Stage)
  (4) First Step of Execution (E1 Stage)
  (5) Second Step of Execution (E2 Stage)
  (6) Complete Instruction (CT Stage)

The addresses of the instructions being operated at the individual pipeline stages are individually held in registers. The instruction address being operated at the IF stage is held in a register 121, and the instruction addresses being operated at the ID stage, the E1 stage, E2 stage and the CT stage are held by registers 122, 123, 124 and 125, respectively.
(1) IA Stage The address of an instruction to be operated next is determined at the IA stage. When the instruction just before is a branch, the content of a register 131 is set as the address of a next instruction in the register 121. When the instruction just before is other than a branch, the length of an instruction just before is added to the address of the same in the program counter 132, and the sum is set in the register 121.
(2) IF Stage At the IF stage, the instruction is read (fetched) from the program memory 110 by a fetch circuit which uses the instruction address held in the register 121. On the other hand, the instruction, as held in the register 121, is transferred to the register 122.
(3) ID Stage At the ID stage, the instruction, as fetched from the program memory 110, is decoded by an instruction decoder 111 to generate a control signal necessary for subsequent pipeline operations. On the other hand, the instruction, as held in the register 122, is transferred to the register 123. The control signal (decoded instruction signal) and data with respect to the control signal are input to the logic circuits.
(4) E1 Stage At the E1 stage, a first instruction execution step is executed according to the control signal generated by the instruction decoder 111. On the other hand, the instruction address, as held in the register 123, is transferred to the register 124.
(5) E2 Stage At the E2 stage as at the E1 stage, a second instruction execution step is executed according to the control signal generated by the instruction decoder 111. On the other hand, the instruction address, as held in the register 124, is transferred to the register 125.
(6) CT Stage At the CT stage, it is confirmed whether or not the execution of the instruction has been normally completed. When the execution has not been normally completed, the instruction address, as held in the register 125, is transferred to a register 126 to start the exception operation.

In the exception operation, the instruction which has caused the exception can be determined by reading the exception causing instruction address held in the register 126. When the instruction causing the exception has to be retried, the aforementioned exception causing instruction address is set in the register 121 to start again from the IF stage.

<Construction of Logic Circuit>

In FIG. 1, a logic circuit 141 is one for operating the first step of the instruction execution at the E1 stage. On the other hand, a logic circuit 142 is one for operating the second step of the instruction execution at the E2 stage (multistage logic circuits). These logic circuits 141 and 142 are composed of logic gates 202, 203 and 200, 201 respectively.

Each logic gate is received both the true and complement signals of an input signal, and outputs both the true and complement signals of an output signal. Here:

the true signal takes a high potential (e.g., $E_H$, which is designated hereinafter by "H"), when the signal logically takes "1", and a low potential (e.g., lower than $E_L$, which is designated hereinafter by "L") when the signal is "0"; and the complement signal takes a high potential, when the signal logically takes "0", and a low potential when the signal is "1".

A data latch 151 is a pipeline operating data latch for transmitting the execution result of the first step of the instruction execution at the E1 stage, i.e., the output of the logic circuit 141 to the E2 stage.

A data latch 152 is a pipeline operating data latch for transmitting the execution result of the second step of the instruction execution at the E2 stage, i.e., the output of the logic circuit 142 to the CT stage.

The data latch 151 holds both the true signal and the complement signal as the outputs of the logic circuit 141 independently of each other, and outputs both the true signal and the complement signal as the inputs of the logic circuit 142 independently of each other.

The data latch 152 receives both the true signal and the complement signal as the outputs of the logic circuit 142, latches the data and outputs either the true signal or the complement signal to the (not-shown) logic circuit of the CT stage.

Here will be described the internal configurations of the logic gates 200, 201, 202 and 203 constructing the aforementioned logic circuits. The internal configuration of the logic gate 200 is representatively shown in FIG. 2. The internal configurations of the remaining logic gates are different in their logical function portions depending upon the difference in the logical functions realized, but the remaining portions are similar. Also, in FIG. 1, logic circuits 141 and 142 are shown as having two logic gates in parallel, which are a plurality of logic gates, but in actual design, each logic circuit has combinations of gates in parallel and/or in multistages. Additionally, although the logic gates 200–204 are shown as being in respective logic circuits 141 and 142, the logic circuits are designated conceptually as shown by the dashed lines to show multistage logic circuits according to an embodiment of the invention. However, it is contemplated that there could be only one logic circuit in the figure in which each of the logic gates 200–203 is a part, or no logic circuit designation at all, indicating that the gates 202–203 are a portion of a logic circuit, the entirety of which is not designated for clarity.

Figure 2:
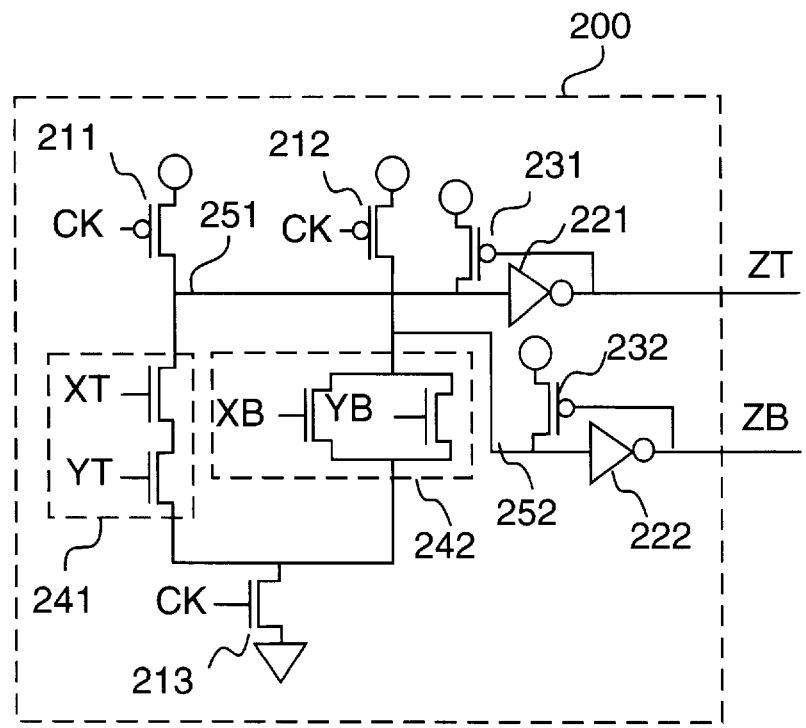
FIG. 2 is a circuit diagram showing an example of the configuration of a logic gate 200 of FIG. 1.

As shown in FIG. 2, two input signals X and Y are inputted to generate an output signal Z. The input signals X and Y are composed of true signals XT or YT and complement signals XB or YB, respectively, and the output signal Z is composed of a true signal ZT and a complement signal ZB. Inverters 221 and 222 are buffers for outputting the output signals ZT and ZB, respectively.

P-channel MOS field effect transistors (as will be expressed as "pMOS-FETs") 211 and 212 and n-channel MOS field effect transistor (as will be expressed as "nMOS-FET) 213 are circuits for resetting both the output signals ZT and ZB to the low potential when a control signal CK is at the low potential.

Logic function units 241 and 242 are networks which are individually constructed of series connections and parallel connections of nMOS-FETs and which are individually equipped with upper and lower terminals.

The logic function unit 241 is made conductive between its upper and lower terminals by the network of nMOS-FETs, when the result of the logic operations, as realized by the logic gate 200, is true, but nonconductive between its upper and lower terminals by the network of the nMOS-FETs when false.

On the other hand, the logic function unit 242 is made conductive between its upper and lower terminals by the network of nMOS-FETs, when the result of the logic operations, as realized by the logic gate 200, is true, but nonconductive between its upper and lower terminals by the network of the nMOS-FETs when false. PMOS-FETs 231 and 232 acts, after precharged, to keep the precharged states when the logic circuit units 241 and 242 are nonconductive.

Figure 3:
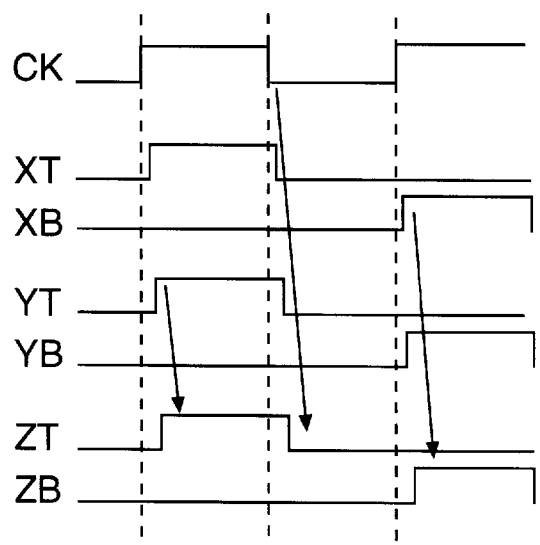
FIG. 3 is a time chart illustrating the action of the logic gate 200 of FIG. 2.

FIG. 3 illustrates a timing chart for explaining relations between the control signal CK and the input signals XT, XB, YT and YB, and the output signals ZT and ZB. When the control signal CK is at the low potential, both the output signals ZT and ZB are reset to the low potential. When the control signal CK takes the high potential, either the output signal ZT or ZB takes the high potential in accordance with the logic function realized by the logic gate 200.

<Soft Error of Logic Circuit>

In the case of the precharged logic circuit, as shown in FIG. 2, it is known that the incidence of α rays causes a soft error in which the internal signal levels are inverted.

In the logic function unit 241, when the input signal XT is at the low potential (L), the nMOS-FET, connected at its gate terminal with the input signal XT, is nonconductive, and a node 251 keeps the precharged high-potential state, even after the control signal CK transited to the high potential, so that the output signal ZT outputs the low potential (L). When the α rays then enter the drain region of the nMOS-FET connected at its gate terminal with the input signal XT, the negative charges are collected at the drain of the nMOS-FET by the ionizations of the α rays thereby to forcibly set the node 251 having the connected drain terminal to the low terminal. As a result, the output signal ZT takes the high potential (H) although it should intrinsically be at the low potential (L). This is called a soft error.

When the α rays enter the drain region of the pMOS-FET 211, the node 251 is forcibly set to the high potential. However, the fact that the node 251 should intrinsically have the low potential implies that the logic function unit 241 is conductive, so that the node 251 can be restored to the intrinsic low potential by the action of the logic function unit 241.

As a result, the incidence of the α rays on the drain region of the pMOS-FET invites an elongation of the delay time period but will not cause such a fatal error that the potential of the signals is continuously inverted before the next reset.

<Error Detection>

The soft error due to the aforementioned incidence of α rays can be detected in the case of the logic circuit for generating both the true and complement output signals independently, as shown in FIG. 2.

(1) Error Detection of Single Gate

The output signal ZT is generated from the logic function unit 241, the precharging pMOS-FET 211, the outputting inverter 221 and the high-potential holding pMOS-FET 231; and the output signal ZB is generated by the logic function unit 242, the precharging PMOS-FET 212, the outputting inverter 222 and the high-potential latching PMOS-FET 232, which are all constructed of independent circuits.

A soft error due to the incidence of α rays will exert influences only upon a narrow region so that it exerts no influence upon the side of the output signal ZB even if the soft error occurs at the side of the output signal ZT. It is, therefore, possible to detect the occurrence of the soft error if it is confirmed that the output signals ZT and ZB do not take the opposite signal potentials when the logic signal is outputted.

In the case of the logic circuit of FIG. 2, a soft error indicates that either the output signal ZT or ZB takes the high potential when it should intrinsically be at the low potential. Since the other output signal outputs the intrinsic high potential, it is sufficient for detecting the soft error whether or not both the output signals ZT and ZB are at the high potential.

AND gates 161 and 162 (both of positive logics) of FIG. 1 are circuits for detecting the errors of the logic circuits 200 and 201. These circuits detect that both the true and complement output signals are at the high potential. Here, NOR gates 171 and 172 (both of positive logics) will be described hereinafter.

(2) Error Detections of Outputs

An OR gate 163 of FIG. 1 is a circuit for detecting an error, if it occurs even in one of logic gates constructing the logic circuit 142.

A data latch 164 is a circuit for latching a signal indicating that an error occurs for a time period in which the logic circuit 142 is not being precharged but outputting a logically significant signal.

(3) Error Detection of Multistage Logics

In the internal circuit of the logic circuit 142 of FIG. 1, the logic gates 200 and 201 are present in parallel, but a plurality of logic gates may be connected in series. In this case, too, the error detecting AND gate may be inserted just before the position (of the data latch 152 in FIG. 1) where both the true and complement signals are converted into one of either of the true or complement signal.

The reason for this is as follows. When an error occurs in an input signal, for example, of the input signals to be inputted to logic gates as will influence the logic values of the output signals, as viewed from the states of other input signals and the realized logic functions, so that both the true signal and the complement signal take the high potential, both the true signal and the complement signal take the high potential even at the outputs of the logic gates so that the error state will be propagated.

Here will be explained the behaviors in which the errors of the input signals are propagated to the output signals in the logic gates for outputting the true and complement signals by inputting them. All the logic gates can be realized by combining AND gates and OR gates used as basic gates.

The circuit of FIG. 2 is an AND gate. The relations of the input signals and the output signals of the circuit are tabulated in FIG. 4. Here will be considered the case in which the input signal X has an error and both the true and complement signals XT and XB take the high potential "H". When the input signal Y is at the logic value "0" (that is, when the YT is at "L" whereas the YB is at "H"), the output signal Z is at the logic value "0" (that is, when the ZT is at "L" whereas the ZB is at "H") independently of the value of the input signal X, so that the error states of the input signals are not propagated to the output signals thereby to ensure the normal operations.

When the input signal Y is at the logic value "1" (that is, when the YT is at "H" whereas the YB is at "L"), on the other hand, both the true and complement signals ZT and ZB of the output signals take "H" so that the error states of the input signals are propagated to the output signals.

Here will be further considered the case in which the input signal X has an error and both the true and complement signals XT and XB take the low potential "L". When the input signal Y is at the logic value "0" (that is, when the YT is at "L" whereas the YB is at "H"), the output signal Z is at the logic value "0" (that is, when the ZT is at "L" whereas the ZB is at "H") independently of the value of the input signal X, so that the error states of the input signals are not propagated to the output signals thereby to ensure the normal operations.

When the input signal Y is at the logic value "1" (that is, when the YT is at "H" whereas the YB is at "L"), on the other hand, both the true and complement signals ZT and ZB of the output signals take "L" so that the error states of the input signals are propagated to the output signals.

Figures 4, 5:
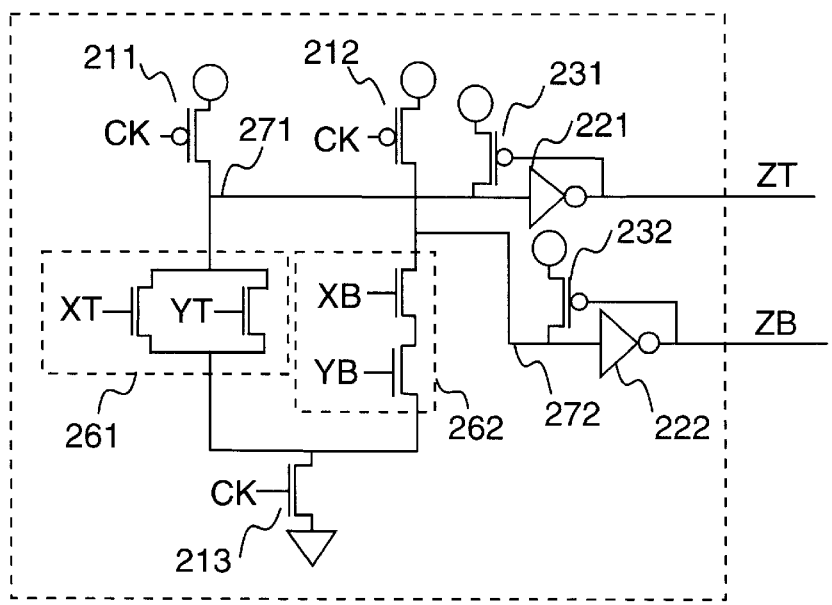
FIG. 4 is a diagram presenting a table for explaining the functions of the logic gate 200 of FIG. 2.
FIG. 5 is a circuit diagram showing another example of the construction of the logic gate.

Another basic circuit is the OR gate shown in FIG. 5. The relations of the input signals and the output signals of the circuit are tabulated in FIG. 6.

Here will be considered the case in which an input signal X has an error and both the true and complement signals XT and XB take the high potential "H". When the input signal Y is at the logic value "1" (that is, when the YT is at "H" whereas the YB is at "L"), the output signal Z is at the logic value "1" (that is, when the ZT is at "H" whereas the ZB is at "L") independently of the value of the input signal X, so that the error states of the input signals are not propagated to the output signals thereby to ensure the normal operations.

When the input signal Y is at "0" (that is, when the YT is at "L" whereas the YB is at "H"), on the other hand, both true and complement signals ZT and ZB of the output signals take "H" so that the error states of the input signals are propagated to the output signals.

Here will be further considered the case in which an input signal has an error and both the true and complement signals XT and XB take "L". When the input signal Y is at the logic value "1" (that is, when the YT is at "H" whereas the YB is at "L"), the output signal Z is at the logic value "1" (that is, when the ZT is at "H" whereas the ZB is at "L") independently of the value of the input signal X, so that the error states of the input signals are not propagated to the output signals thereby to ensure the normal operations.

When the input signal Y is at the logic value "0" (that is, when the YT is at "L" whereas the YB is at "H"), on the other hand, both the true and complement signals ZT and ZB of the output signals take "L" to propagate the error states of the input signals to the output signals.

For the basic AND gate and OR gate, as has been described hereinbefore, the state of an error is propagated to the output signals when the values of the input signal exert direct influences upon the output signal values. It is also apparent in all the logic gates that the state of an error is propagated to the output signals when the values of the input signals exert direct influences upon the output signal values.

When the logic gates are connected in multiple stages, therefore, it is possible to detect, at the final stage, the error having occurred in the logic gates upstream of the final stage.

(4) Error Detection of Multiple Stages

When the logic gates are connected in multiple stages, the pipeline stage data latches may be inserted midway. In this case, the data latch 151 may be constructed, as shown in FIG. 1, such that it holds both the true and complement signals or the outputs of the logic circuits independently of each other to output both the true and complement signals independently of each other. When there is inputted as the input signal to the data latch the error state in which both the true and complement signals take the "H", the data can be latched as they are to propagate the error state in which both the true and complement signals take the "H" as the output signals.

As a result, the error, as having been caused in a logic gate upstream of the final stage, can be detected if the detection is made at the final stage of the logic gate by constructing the data latch, as described, above, even when the logic circuit extends over a plurality of pipeline stages.

<Retry of Error Causing Instruction>

When the error of the logic circuits is detected, the malfunction can be avoided in the embodiment (of FIG. 1) of the present invention by retrying the instruction that has caused the error.

In FIG. 1, the data latch 164 latches the signal indicating that errors have occurred in the logic circuits 142 and 141.

A control circuit 180 receives the output signal of the data latch 164, to transfer, if an error occurs, the instruction address, as held in the register 125 and being executed, to the register 126 and to set a flag 181 indicating that the error has occurred in the logic circuit, and then starts an exception operation. When the exception operation is executed or an error is detected, a signal for showing the execution or the error is outputted from an output pin (not shown in FIG. 1) of the processor. So a program with respect to the exception operation or the error can be invoked by the signal.

In this exception operation, the flag 181 is read to decide the error of the logic circuit. The error of the logic circuit is possibly, if any, a soft error due to the incidence of α rays, and the instruction having caused the error may be normally completed by retrying it. In the exception operation, therefore, the instruction, as set in the register 126 and having caused the exception, is retried by reading its address to fetch again the instruction from the address.

Here will be described the procedure of the exception operation step by step.

(1) Discrimination of Exception Kinds

The kinds of exception operations are numerous such as the aforementioned logic circuit error or external interruptions. At the head of the exception operation routine, therefore, it is necessary to discriminate which exception operation it is.

In the aforementioned logic circuit error, the error flag 181 is et in the control circuit 180 so that the logic circuit error can be discriminated by reading and checking the error flag 181. The exception operation of another kind can be discriminated by checking the corresponding flag.

(2) Read of Address of Exception Causing Instruction

When the result of the discrimination of the aforementioned exception kind has been found to be the error of the logic circuit, the program is resumed from the instruction having caused that error.

For this purpose, it is necessary at first to read the address of the instruction having caused the aforementioned logic circuit error. The address of the exception causing instruction is read from the register 126 to a general purpose register 133.

(3) Set of Retried Instruction Address

In order to resume the program from the instruction having caused the error, it is sufficient to make a branch to the address read by the general purpose register 133.

In the register 131 for the branch address, therefore, there is set the address of the exception causing instruction which was read by the general purpose register 133. After this, a branch instruction is executed to transfer the control of the program to the address which is indicated by the aforementioned register 131 for the branch address.

(4) Retry of Program

The operations up to the aforementioned execution of the branch instruction is the exception operation routine, and the branch destination is the program which starts at the instruction to be retried. The error causing instruction can be retried by the steps thus far described.

<Delay Margin Error>

As described above, the malfunction due to the incidence of α rays can be avoided by detecting when both the true and complement output signals of the logic circuit are at the high potential. In the present embodiment, moreover, the malfunction due to the delay time failure can also be avoided by detecting when both the true and complement output signals of the logic circuit are at the low potential.

In the logic gates (e.g., 200) composing the logic circuits 142 and 141, both the true and complement output signals are reset in advance at the low potential by the control signal CK. With no failure in the delay time, one of both the true and complement output signals never fails to be shifted to the high potential. Therefore, the low potential of both the true and complement output signals indicates that the delay time has failed.

The NOR gates 171 and 172 (both of the positive logic) of FIG. 1 detect that both the true and complement output signals of the logic gates 200 and 201 are at the low potential. An OR gate 173 detects an error, which is caused by the failure in the delay time even at one of logic gates constructing the logic circuit 142.

As tabulated in FIGS. 4 and 6, the error state of the input signals, in which both the true and complement input signals are at the low potential, i.e., "L", is propagated to the output, when the values of the input signals exert direct influences upon the values of the output signals so that both the true and complement output signals take the low potential, i.e., "L".

Of the errors due to the delay time failure like the errors due to the incidence of α rays, therefore, the errors having occurred at stages upstream of the final stage can be detected even for the multistage gates, if the error is detected at the final stage, as shown in FIG. 1.

In the case of the multiple stages, moreover, the error states are propagated, like the errors due to the incidence of α rays, by the pipeline stage data latch 151 so that the error, if caused even in one of the logic circuits 141 and 142 due to the delay time failure, can be detected.

The error, as detected by the aforementioned error detecting means, is latched in a data latch 174. A control circuit 180 receives the output signal of the data latch 174, to transfer, if an error occurs, the instruction address, as held in the register 125 and being executed, to the register 126 and to set a flag 182 indicating that the error has occurred in the logic circuit, and then starts an exception operation.

According to the present embodiment, as has been described hereinbefore, it is possible to avoid not only the malfunction due to the incidence of α rays but also the malfunction due to the delay time failure.

When a CISC is used as the aforementioned microprocessor, the operation-based execution is performed so that it is retried if an error is detected. CISC operation is generally controlled by a microprogram, and the operation-based execution (macro-instruction-based execution) is performed. When the RISC is used, the instruction-based execution is performed so that it is retried when an error is detected.

According to the present invention, as has been described in connection with its specific embodiment, it is possible to detect the occurrence of a soft error in the logic circuit due to the incidence of α rays.

When the aforementioned soft error occurs, moreover, the malfunction due to the soft error can be avoided by retrying the operation or instruction having caused the error.

According to the present invention, still moreover, the soft error due to the incidence of α rays need not be prevented from occurring at the individual gates so that the logic gates can be optimized in terms of the speed-up thereby to increase the action speed of the entire logic circuit.

We claim:

1. A logic circuit, comprising:
a first logic circuit having a plurality of stages of logic gates, each of the logic gates outputting a true output signal and a complement output signal in response to an incoming true signal and an incoming complement signal, wherein a true signal and a complement signal output from one of said logic gates are input to a next one of said logic gates of a next stage after the one logic gate, and
a circuit for detecting that the true output signal and the complement output signal of said next logic gate are in a relation of a same logic signal level, by comparing the first true output signal and the first complement output signal of said next logic gate at the time of outputting logic signals of said first logic circuit.

2. A logic circuit, comprising:
a first logic circuit having a plurality of stages of logic gates, each of the logic gates:
outputting a true output signal and a complement output signal in response to an incoming true signal and an incoming complement signal,
setting the true output signal and the complement output signal to an equal logic signal level during a first precharge of the logic gates,
inverting one of both the true output signal and the complement output signal between the first precharge and a precharge after the first precharge,
wherein the true output signal and the complement output signal output of one of said logic gates are input to at least one of said logic gates of a next stage after said one logic gate, and
a circuit for comparing the true output signal and the complement output signal output from a logic gate of a last stage of said logic gates between the first precharge and the next precharge after the first precharge, so that the circuit detects that the true output signal and the complement output signal of said last stage logic gate are in a relation of equal signal levels.

3. A logic circuit, comprising:
a plurality of stages of first logic circuits, said first logic circuit having a plurality of stages of logic gates, each of the logic gates outputting a true output signal and a complement output signal in response to an incoming true signal and an incoming complement signal, wherein a true output signal and a complement output signal output from each of said logic gates are input to at least one of said logic gates after said one logic gate, and
a second circuit for detecting that the true output signal and the complement output signal of one of said logic gates in front of a third circuit, are in a relation of a same logic signal level, by comparing the true output signal and the complement output signal of said one logic gate at the time of outputting logic signals of said logic circuit, wherein the third circuit receives the true output signal and the complement output signal of said one logic circuit and outputs only one signal.

4. A logic circuit, comprising:
a plurality of stages of first logic circuits, said first logic circuit having a plurality of stages of logic gates, each of the logic gates:
outputting a true output signal and a complement output signal in response to an incoming true signal and an incoming complement signal,
setting the true output signal and the complement output signal to an equal logic signal level during a first precharge of the logic gates,
inverting one of both the true output signal and the complement output signal between the first precharge and a precharge after the first precharge,
wherein the true output signal and the complement output signal output of one of said logic gates are input to at least one of said logic gates of a next stage after said one logic gate; and
a second circuit for detecting that the true output signal and the complement output signal of one of said logic gates in front of a third circuit, are in a relation of a same logic signal level, by comparing the true output signal and the complement output signal of said one logic gate between the first precharge and a precharge after the first precharge, wherein the third circuit receives the true output signal and the complement output signal of said one logic circuit and outputs only one signal.

5. A logic circuit, comprising:
a plurality of stages of first logic circuits, said first logic circuit having a plurality of stages of logic gates, each of the logic gates outputting a true output signal and a complement output signal in response to an incoming true signal and an incoming complement signal, wherein a true output signal and a complement output signal output from each of said logic gates are input to at least one of said logic gates after said one logic gate, and
a second circuit for detecting that the true output signal and the complement output signal of one of said logic gates arranged before a third circuit, are in a relation of a same logic signal level, by comparing the true output signal and the complement output signal of said one logic gate at the time of outputting logic signals of said logic circuit, wherein the third circuit receives and converts the true output signal and the complement output signal into one of the true signal and the complement signal as an output signal.

6. A logic circuit, comprising:
a plurality of stages of first logic circuits, said first logic circuit having a plurality of stages of logic gates, each of the logic gates:
outputting a true output signal and a complement output signal in response to an incoming true signal and an incoming complement signal, setting the true output signal and the complement output signal to an equal logic signal level during a first precharge of the logic gates, inverting one of both the true output signal and the complement output signal between the first precharge and a precharge after the first precharge, wherein the true output signal and the complement output signal output of one of said logic gates are input to at least one of said logic gates of a next stage after said one logic gate; and a second circuit for detecting that the true output signal and the complement output signal of one of said logic gates arranged before a third circuit, are in a relation of a same logic signal level, by comparing the true output signal and the complement output signal of said one logic gate between the first precharge and a precharge after the first precharge, wherein the third circuit receives and converts the true output signal and the complement output signal into one of the true signal and the complement signal as an output signal.

7. A logic circuit according to claim 3, further comprising:

a first data latch and a second data latch, between the first logic circuit and a logic circuit of a next stage of the first logic circuit, wherein said first data latch is for holding said true output signal output from the first logic circuit and for inputting said true signal to the logic circuit of the next stage of the first logic circuit, and wherein said second data latch is for holding said complement output signal output from the first logic circuit and for inputting said complement signal to the logic circuit of the next stage of the first logic circuit.

8. A logic circuit according to claim 4, further comprising:

a first data latch and a second data latch, between the first logic circuit and a logic circuit of a next stage of the first logic circuit, wherein said first data latch is for holding said true output signal output from the first logic circuit and for inputting said true signal to the logic circuit of the next stage of the first logic circuit, and wherein said second data latch is for holding said complement output signal output from the first logic circuit and for inputting said complement signal to the logic circuit of the next stage of the first logic circuit.

9. A logic circuit according to claim 5, further comprising:

a first data latch and a second data latch, between the first logic circuit and a logic circuit of a next stage of the first logic circuit, wherein said first data latch is for holding said true output signal output from the first logic circuit and for inputting said true signal to the logic circuit of the next stage of the first logic circuit, and wherein said second data latch is for holding said complement output signal output from the first logic circuit and for inputting said complement signal to the logic circuit of the next stage of the first logic circuit.

10. A logic circuit according to claim 6, further comprising:

a first data latch and a second data latch, between the first logic circuit and a logic circuit of a next stage of the first logic circuit, wherein said first data latch is for holding said true output signal output from the first logic circuit and for inputting said true signal to the logic circuit of the next stage of the first logic circuit, and wherein said second data latch is for holding said complement output signal output from the first logic circuit and for inputting said complement signal to the logic circuit of the next stage of the first logic circuit.

11. A processor system comprising:

a memory for storing instructions;

a fetch circuit for reading an instruction from the memory;

a decoder for decoding instructions read by the fetch circuit and outputting a decoded signal;

a first logic circuit having a plurality of stages of logic gates, each of the logic gates outputting a true output signal and a complement output signal in response to an incoming true signal and an incoming complement signal, wherein a true signal and a complement signal output from one of said logic gates are input to at least one of said logic gates of a next stage after the one logic gate, and a second circuit for detecting that the true output signal and the complement output signal of said logic gate are in a relation of a same logic signal level, by comparing the first true output signal and the first complement output signal of said logic gate at the time of outputting logic signals of said first logic circuit, wherein a first decoded signal is inputted to the first logic circuit, and wherein when the second circuit detects that the first true output signal and the first complement output signal of the logic gate are in a relation of a same logic signal level, the first decoded signal is again inputted to the first logic circuit.

12. A processor system comprising:

a memory for storing instructions;

a fetch circuit for reading an instruction from the memory;

a decoder for decoding an instruction read by the fetch circuit and outputting a decoded signal;

a first logic circuit having a plurality of stages of logic gates, each of the logic gates:

outputting a true output signal and a complement output signal in response to an incoming true signal and an incoming complement signal, setting the true output signal and the complement output signal to an equal logic signal level during a first precharge of the logic gates, inverting one of both the true output signal and the complement output signal between the first precharge and a precharge after the first precharge, wherein the true output signal and the complement output signal output of one of said logic gates are input to at least one of said logic gates of a next stage after said one logic gate, and a second circuit for comparing the true output signal and the complement output signal output from a logic gate of a last stage of said logic gates between the first precharge and the next precharge after the first precharge, so that the second circuit detects that the true output signal and the complement output signal of said last stage logic gate are in a relation of equal signal levels, wherein the first decoded signal is inputted to the first logic circuit, and wherein when the second circuit detects that the first true output signal and the first complement output signal of the last stage logic gate are in a relation of a same logic signal level, the first decoded signal is again inputted to the first logic circuit.

13. A processor system according to claim 11, wherein the first signal again inputted to the first logic circuit is again decoded from an instruction again read by the fetch circuit.

14. A processor system according to claim 12, wherein the first signal again inputted to the first logic circuit is again decoded from an instruction again read by the fetch circuit.

15. A logic circuit according to claim 3, further comprising:

a memory for storing instructions;

a fetch circuit for reading an instruction from the memory; and a decoder for decoding instruction read by the fetch circuit and outputting a decoded signal;

wherein a first decoded signal is inputted to a logic gate of a first stage in the first logic circuit of a first stage, and wherein when the second circuit detects that the first true output signal and the first complement output signal of the logic gate of the last stage of the first logic circuit are in a relation of a same logical signal level, the first decoded signal is again inputted to the first logic circuit.

16. A logic circuit according to claim 4, further comprising:

a memory for storing instructions;

a fetch circuit for reading an instruction from the memory; and a decoder for decoding instruction read by the fetch circuit and outputting a decoded signal;

wherein a first decoded signal is inputted to a logic gate of a first stage in the first logic circuit of a first stage, and wherein when the second circuit detects that the first true output signal and the first complement output signal of the logic gate of the last stage of the first logic circuit are in a relation of a same logical signal level, the first decoded signal is again inputted to the first logic circuit.

17. A logic circuit according to claim 5, further comprising:

a memory for storing instructions;

a fetch circuit for reading an instruction from the memory; and a decoder for decoding instruction read by the fetch circuit and outputting a decoded signal;

wherein a first decoded signal is inputted to a logic gate of a first stage in the first logic circuit of a first stage, and wherein when the second circuit detects that the first true output signal and the first complement output signal of the logic gate of the last stage of the first logic circuit are in a relation of a same logical signal level, the first decoded signal is again inputted to the first logic circuit.

18. A logic circuit according to claim 6, further comprising:

a memory for storing instructions;

a fetch circuit for reading an instruction from the memory; and a decoder for decoding instruction read by the fetch circuit and outputting a decoded signal;

wherein a first decoded signal is inputted to a logic gate of a first stage in the first logic circuit of a first stage, and wherein when the second circuit detects that the first true output signal and the first complement output signal of the logic gate of the last stage of the first logic circuit are in a relation of a same logical signal level, the first decoded signal is again inputted to the first logic circuit.

19. A logic circuit according to claim 15, wherein the first signal again inputted to the first logic circuit is again decoded from an instruction again read by the fetch circuit.

20. A logic circuit according to claim 16, wherein the first signal again inputted to the first logic circuit is again decoded from an instruction again read by the fetch circuit.

21. A logic circuit according to claim 17, wherein the first signal again inputted to the first logic circuit is again decoded from an instruction again read by the fetch circuit.

22. A logic circuit according to claim 18, wherein the first signal again inputted to the first logic circuit is again decoded from an instruction again read by the fetch circuit.

\* \* \* \* \*